US010458554B2

United States Patent
Gattavari et al.

(10) Patent No.: US 10,458,554 B2
(45) Date of Patent: Oct. 29, 2019

(54) ADJUSTMENT VALVE WITH ENERGY RECOVERY

(71) Applicant: LOCLAIN S.R.L., Imola (Bologna) (IT)

(72) Inventors: Claudio Angelo Gattavari, Bagnacavallo (IT); Lorenzo Ferioli, Imola (IT)

(73) Assignee: LOCLAIN S.R.L., Imola (IT)

( * ) Notice: Subject to any disclaimer, the term of this patent is extended or adjusted under 35 U.S.C. 154(b) by 228 days.

(21) Appl. No.: 14/765,178

(22) PCT Filed: Feb. 25, 2014

(86) PCT No.: PCT/IB2014/059229
§ 371 (c)(1),
(2) Date: Jul. 31, 2015

(87) PCT Pub. No.: WO2014/132187
PCT Pub. Date: Sep. 4, 2014

(65) Prior Publication Data
US 2015/0369375 A1    Dec. 24, 2015

(30) Foreign Application Priority Data
Feb. 27, 2013   (IT) .............................. MO2013A0051

(51) Int. Cl.
*F03B 13/00* (2006.01)
*H02P 9/04* (2006.01)
(Continued)

(52) U.S. Cl.
CPC .............. *F16K 3/08* (2013.01); *F03B 11/004* (2013.01); *F03B 13/00* (2013.01); *F03B 15/04* (2013.01);
(Continued)

(58) Field of Classification Search
CPC ... F16K 3/08; F16K 3/085; F16K 1/06; F16K 1/18; F03B 11/004
(Continued)

(56) References Cited

U.S. PATENT DOCUMENTS

| 621,864 A | * | 3/1899 | Smith | ................. F16K 1/305 |
| | | | | 137/613 |
| 2,436,683 A | * | 2/1948 | Wood, Jr. | ............... H02K 5/128 |
| | | | | 290/43 |

(Continued)

FOREIGN PATENT DOCUMENTS

| CA | 2644938 A1 | 5/2010 |
| DE | 3443491 A1 | 5/1986 |

(Continued)

*Primary Examiner* — Tulsidas C Patel
*Assistant Examiner* — Thomas K Quigley
(74) *Attorney, Agent, or Firm* — Pearne & Gordon LLP

(57) ABSTRACT

A control valve (1) comprising a valve body (2) having an inlet opening (3) and an outlet opening (4) for a fluid; a obturator (6) placed within the valve body (2) between the inlet and outlet openings (3, 4); recovery means (5) configured to transfer kinetic energy and/or potential energy extracted from the fluid out of the valve body (2), the recovery means (5) comprising a rotating element (7) placed within the valve body (2) downstream of the obturator (6) and configured to be put in rotation by the fluid.

11 Claims, 10 Drawing Sheets

(51) Int. Cl.
  *F16K 3/08* (2006.01)
  *F03B 11/00* (2006.01)
  *F03B 15/04* (2006.01)
  *F16K 47/08* (2006.01)
  *F16K 47/12* (2006.01)
  *H02K 7/18* (2006.01)

(52) U.S. Cl.
  CPC .............. *F16K 47/08* (2013.01); *F16K 47/12* (2013.01); *H02K 7/1823* (2013.01); *F05B 2220/20* (2013.01); *F05B 2220/602* (2013.01); *Y02B 10/50* (2013.01); *Y02E 10/226* (2013.01); *Y02E 10/28* (2013.01); *Y10T 137/8376* (2015.04)

(58) Field of Classification Search
  USPC ........................................ 137/501, 504, 505
  See application file for complete search history.

(56) References Cited

U.S. PATENT DOCUMENTS

| | | | | |
|---|---|---|---|---|
| 3,590,861 A * | 7/1971 | Chittenden | ............... | F16K 3/34 137/501 |
| 3,620,330 A * | 11/1971 | Hall | ............... | F01N 1/003 181/266 |
| 3,753,399 A * | 8/1973 | Dessoris | ............... | B30B 9/122 100/145 |
| 3,784,113 A * | 1/1974 | Specht | ............... | B05B 1/12 239/460 |
| 4,328,831 A * | 5/1982 | Wolff | ............... | B65G 53/30 137/625.31 |
| 4,610,393 A * | 9/1986 | Rodriguez | ............ | F16K 11/0746 137/607 |
| 4,809,510 A * | 3/1989 | Gaspard | ............... | F03B 13/00 290/52 |
| 5,043,592 A * | 8/1991 | Hochstrasser | ............ | F03B 13/00 290/52 |
| 5,092,221 A * | 3/1992 | Travor | ............... | B63B 22/003 89/1.51 |
| 5,143,116 A * | 9/1992 | Skoglund | ............ | G05D 7/0126 137/487 |
| 5,152,465 A * | 10/1992 | Calabro | ............... | B05B 1/3013 239/578 |
| 5,210,962 A * | 5/1993 | Jones, Jr. | ............... | B01J 8/0035 209/244 |
| 5,364,540 A * | 11/1994 | Sciuto | ............... | F25B 43/003 210/266 |
| 5,372,048 A * | 12/1994 | Dunbar | ............... | G01F 1/10 73/861.89 |
| 5,372,157 A * | 12/1994 | Benetti | ............... | F16K 17/0473 137/110 |
| 5,388,466 A * | 2/1995 | Teunissen | ............... | G01F 1/103 73/861.33 |
| 5,417,083 A * | 5/1995 | Eber | ............... | F16K 3/085 251/129.11 |
| 5,664,760 A * | 9/1997 | Army, Jr. | ............... | F16K 1/22 138/44 |
| 6,019,003 A * | 2/2000 | Wieder | ............... | G01F 1/10 73/861.77 |
| 6,089,171 A * | 7/2000 | Fong | ............... | F23C 5/06 110/104 B |
| 6,945,264 B1 * | 9/2005 | Denzel | ............... | F16K 3/085 137/1 |
| 7,385,303 B2 * | 6/2008 | Roos | ............... | F01D 15/10 290/54 |
| 7,723,860 B2 * | 5/2010 | Nagler | ............... | F03B 13/00 290/43 |
| 8,366,070 B2 * | 2/2013 | Rimboym | ............ | F16K 5/0605 137/625.31 |
| 8,807,521 B2 * | 8/2014 | Dunki-Jacobs | ........ | E03C 1/057 251/129.04 |
| 9,599,252 B2 * | 3/2017 | Malavasi | ............ | F16K 5/0605 |
| 2002/0175190 A1 * | 11/2002 | Schwarz | ............ | B05B 11/3019 222/321.9 |
| 2004/0126223 A1 | 7/2004 | Maloney | | |
| 2009/0165866 A1 * | 7/2009 | Fima | ............... | F16K 5/0605 137/15.17 |
| 2010/0247359 A1 * | 9/2010 | Hauri | ............... | F04B 39/08 417/510 |
| 2012/0144841 A1 * | 6/2012 | Short | ............... | F01M 13/04 60/783 |
| 2012/0274066 A1 * | 11/2012 | Montgomery | ........ | F03B 13/00 290/7 |
| 2012/0318386 A1 * | 12/2012 | Guzman | ............ | E03C 1/057 137/560 |
| 2013/0277119 A1 * | 10/2013 | Rogers | ............... | E21B 21/10 175/317 |
| 2013/0309071 A1 * | 11/2013 | Hunter | ............... | F03B 13/22 415/146 |
| 2014/0076415 A1 * | 3/2014 | Dunki-Jacobs | ........ | F16K 3/08 137/78.1 |
| 2015/0204455 A1 * | 7/2015 | Zimmer | ............... | F16K 31/08 251/65 |
| 2017/0191159 A1 * | 7/2017 | Polyak | ............... | C23C 16/45544 |

FOREIGN PATENT DOCUMENTS

| | | | | |
|---|---|---|---|---|
| DE | 102010009215 A1 | | 8/2011 | |
| GB | 2477124 A | * | 7/2011 | ............ F03B 3/06 |
| JP | H02066872 U1 | * | 5/1990 | |
| JP | H05-106753 A | | 4/1993 | |
| RU | 116946 U1 | | 6/2012 | |
| WO | WO-2006053878 A2 | * | 5/2006 | ............ F03B 11/004 |

* cited by examiner

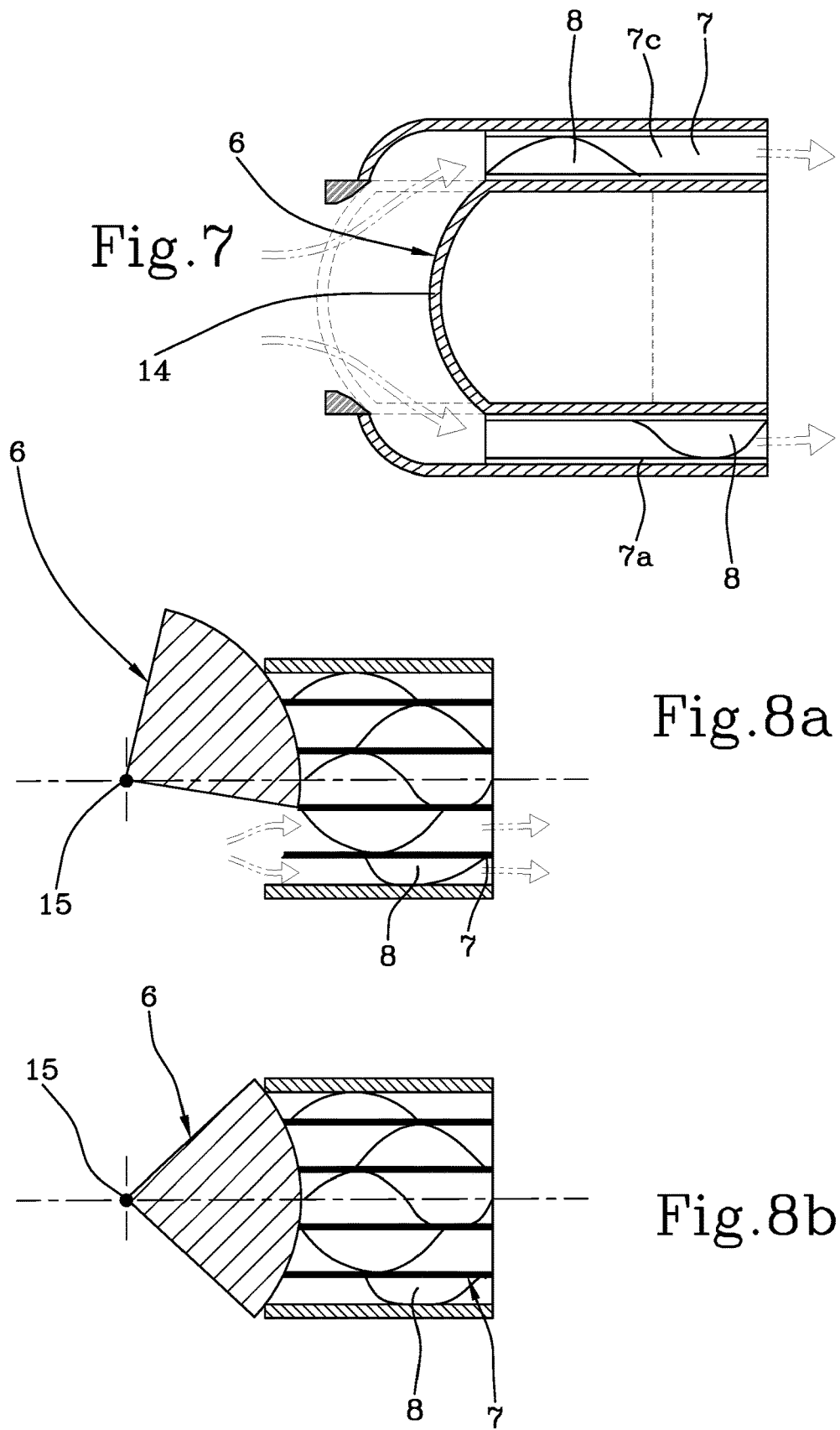

ADJUSTMENT VALVE WITH ENERGY RECOVERY

The present invention relates to a control valve, that is, a fluid dynamic device adapted to regulate and/or alter the pressure or flow of fluid within a conduit. Such fluid may be in the liquid, gas, vapour or bi-phase state. In particular, the valve that forms the subject matter of the present invention can be usefully employed in an industrial hydraulic circuit, particularly in the oil (oils and gas), chemical, petrochemical and energy industry.

Valves of the known art comprise a valve body that has an inlet opening and an outlet opening, from which a fluid transits. An adjustment element is placed within the valve body, in particular between the inlet and outlet openings, so as to vary the flow of the fluid. In particular, a valve of this type can be used to regulate and/or vary the pressure and flow rate of the fluid in the conduit along which the valve is assembled.

Disadvantageously, whenever it is necessary to drastically reduce the pressure within the conduit, it is inevitable that a certain amount of energy, which may even be rather high, is dissipated, both for low flow rates with large pressure changes and for high flow rates with limited pressure changes. The dissipation of energy normally happens in the form of heat and vibrations.

Furthermore, a sudden reduction in pressure can cause fluid cavitation phenomena (for liquids) or choking phenomena (for gases).

Both effects are undesirable, since they introduce irregularities in the flow of liquid, such as vibrations or turbulence. Furthermore, particularly in the event of cavitation, the wear on the pipes and any mechanical parts is substantially accelerated.

In this context, the technical objective underlying the present invention is to provide a valve which obviates the drawbacks in the prior art as described above.

In particular, the object of the present invention is to provide a valve that can recover the energy dissipated through a reduction in pressure. A further object of the present invention is to prevent cavitation phenomena and, in general, irregularities in the flow of fluid.

The technical problem is solved by a valve comprising the technical characteristics of claim 1. The obturator may introduce a first pressure change in the fluid, corresponding to a part of the total desired pressure change. The recovery means, by extracting kinetic and/or potential energy from the fluid, introduce the main pressure change and, at the same time, recover part of the internal energy of the fluid and make it reusable. The internal energy of the fluid, in the embodiment of the invention in accordance with claim 2, is extracted by the rotating element as mechanical work rather than as thermal and vibrational energy.

Further characteristics and advantages of the present invention will become more apparent from the following indicative, and hence non-limiting, description of a preferred, but not exclusive, embodiment of a valve as illustrated in the appended drawings, in which:

FIG. 7 is a sectional view of a further embodiment of the valve according to the present invention;

FIGS. 8a and 8b are sectional views of a further embodiment of the valve according to the present invention, in a partial opening position and a closed position, respectively;

With reference to the appended drawings, 1 indicates a control valve according to the present invention.

The valve 1 comprises a valve body 2. This body has an inlet opening 3 and an outlet opening 4 for the transit of a fluid.

Figure 1:
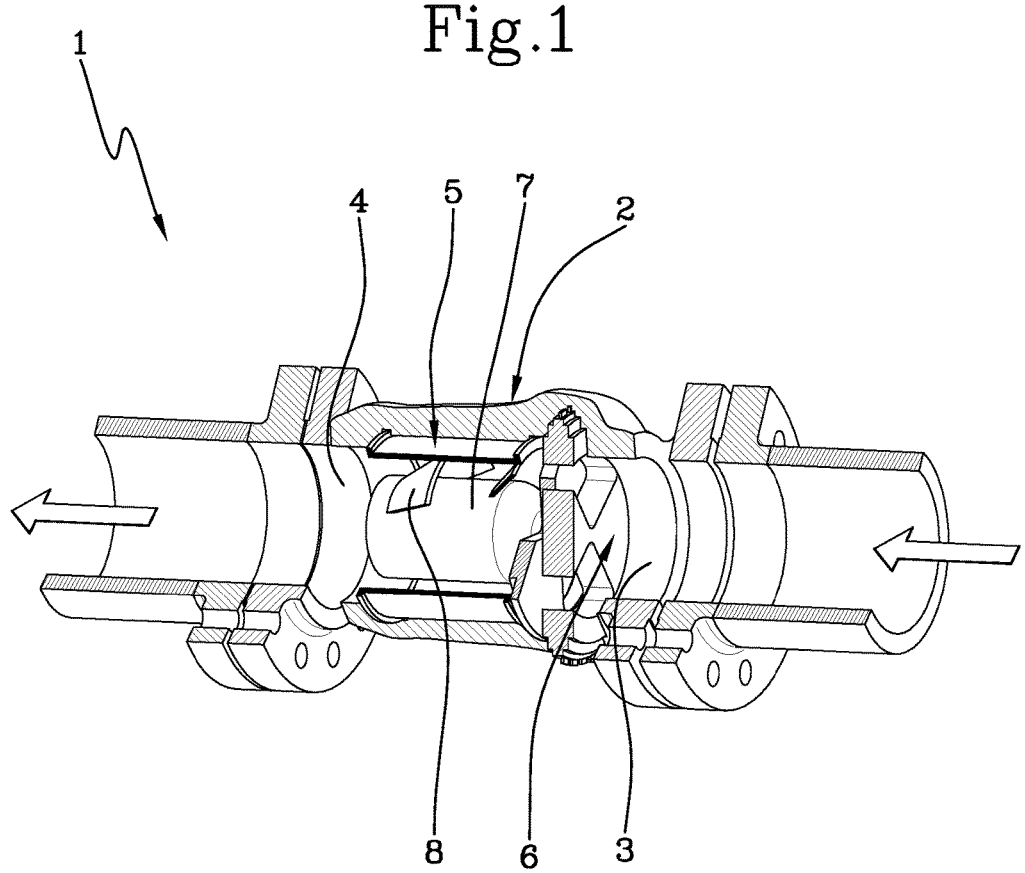
FIG. 1 shows a partially sectional perspective view of a valve according to the present invention.

The valve body 2 can have any shape suitable to allow the passage of the fluid from the inlet opening 3 to the outlet opening 4. In the embodiment of FIG. 1 the valve body has a substantially tubular shape. In alternative embodiments (not shown) the valve body 2 can have more complex shapes.

Note that all the embodiments described and illustrated have a single inlet opening 3 and a single outlet opening 4. Further embodiments (not shown) are possible, having any number of inlet 3 and outlet openings 4. Advantageously, the flow of fluid within the valve 1 may not necessarily be in one direction.

The present invention comprises a obturator 6 placed within the valve body 2. In particular, the obturator 6 is placed between the inlet 3 and outlet openings 4. The obturator 6 is configured so as to direct the fluid towards the recovery means 5 according to a desired direction and/or spatial distribution. The obturator 6 is further structured to assume a closing configuration in which it stops the flow of fluid and closes the valve 1. In other words, the obturator 6 can act as the trim of the valve 1. Advantageously, the obturator 6 contributes to limiting and/or preventing cavitation and/or choking phenomena. Different, particularly advantageous, embodiments of the obturator 6 will be described in detail in the present description as follows.

The valve 1 comprises recovery means 5 configured to convert kinetic and/or potential energy of the fluid into mechanical work and to transfer such mechanical work outside the valve body 2. In other words, the recovery means 5 extract internal energy from the fluid and convert it into kinetic energy, particularly mechanical work. The energy extracted or recovered by the recovery means 5 is, in fact, translated into a load loss of the fluid which reduces its pressure.

The recovery means 5 are contained within the valve body 2, that is, they do not require a separate containment body to be associated with the valve body 2. This enables the overall dimensions of the valve according to the present invention to be contained, and such dimensions to be kept substantially within the dimensions of the control valves currently available.

In a preferred embodiment, the recovery means 5 comprise a rotating element 7 placed within the valve body 2, in particular downstream of the obturator 6. The rotating element 7 is configured to be put in rotation by the fluid transiting within the valve body 2, and has an axis of rotation "A". Preferably the axis of rotation "A" is fixed.

Thanks to the collocation of the rotating element 7 downstream of the obturator 6, the fluid hits the rotating element 7 in a substantially constant direction, apart from any localised turbulence produced by the obturator 6. The rotating element 7 comprises at least one blade 8, configured to intercept the flow of fluid and put the rotating element 7 in rotation. Within the context of the present invention, "blade" could mean any element adapted to interact with the fluid and to enable the development of aero/hydrodynamic forces that can put the rotating element 7 in rotation. Preferably, as shown for example in FIGS. 4a and 5a, the rotating element 7 has a substantially tubular and cylindrical structure. In other words, the rotating element 7 has an external wall 7a and a central portion 7b. Between the external wall 7a and the central portion 7b, an inner zone 7c is defined, in which the fluid transits. One or more blades 8 are placed at such inner zone 7c.

Figure 4A:
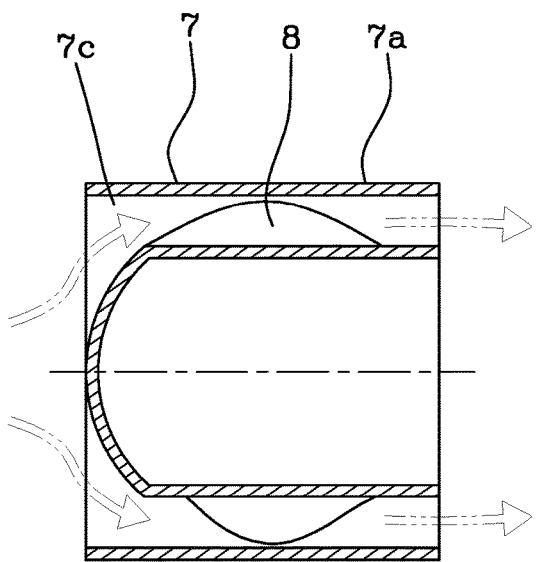
FIGS. 4a and 4b are a sectional view and a perspective view, respectively, of the detail shown in FIGS. 3a and 3b, according to an alternative embodiment.
Figure 4B:
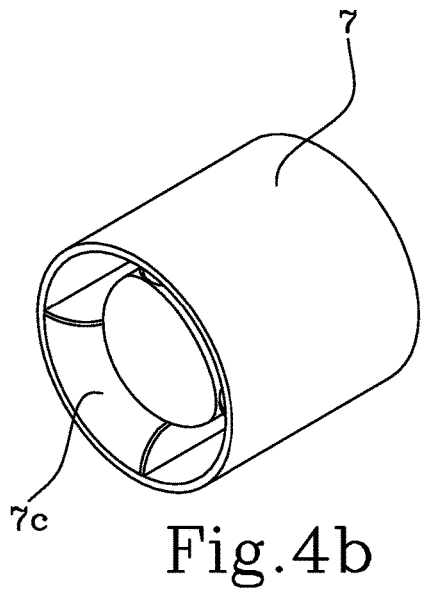
Figure 5:
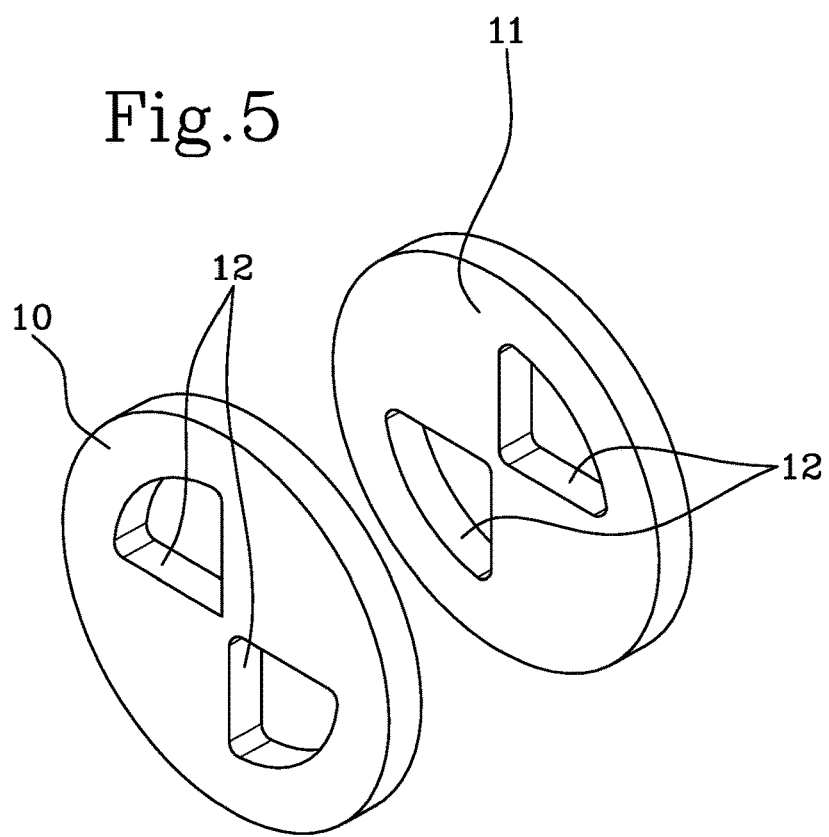
FIGS. 5 and 6 are perspective views of a further detail of the valve of FIG. 1, according to two respective embodiments.
Figure 6:
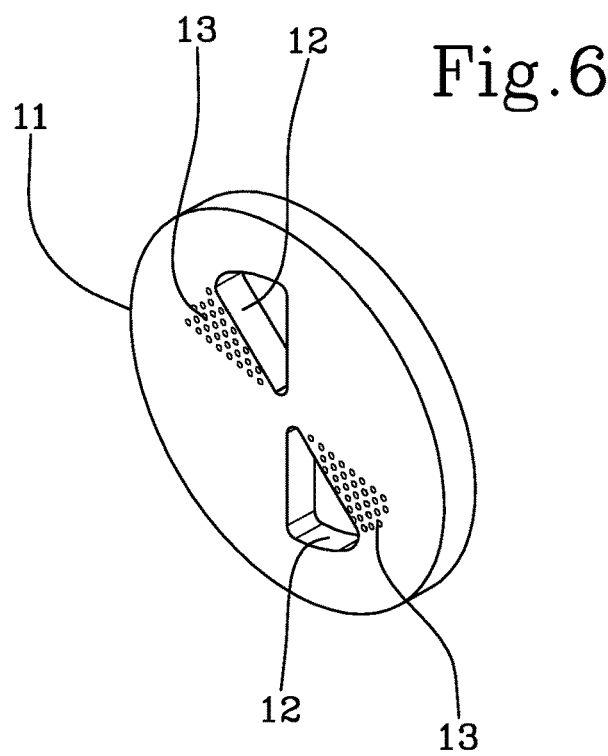

In a first embodiment, shown in FIGS. 4a and 4b, the rotating element 7 and in particular the inner zone 7c is predisposed to be crossed by a flow of fluid that substantially flows parallel to the axis of rotation "A".

Figure 3A:
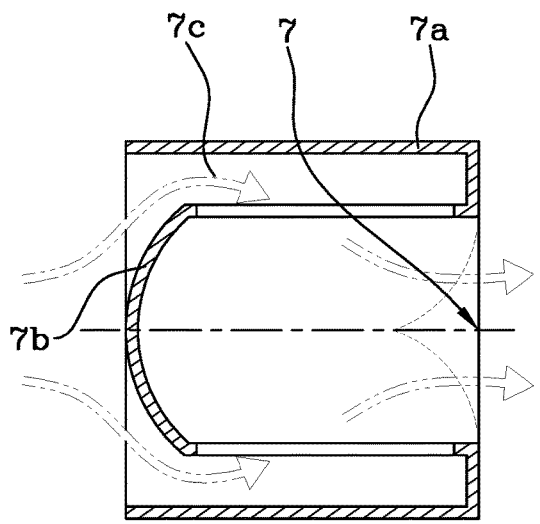
FIGS. 3a and 3b are a sectional view and a perspective view, respectively, of a detail of the valve of FIG. 1, according to a first embodiment.
Figure 3B:
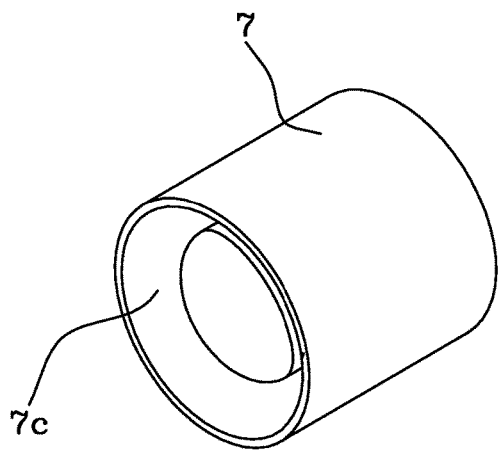

In a second embodiment, shown in FIGS. 3a and 3b, the rotating element 7, and in particular the inner zone 7c, is configured to guide the fluid along a path that is at least partially transversal to the axis of rotation "A" of the rotating element 7. In detail, in this embodiment the fluid follows a path, at least for a stretch, oriented along a radial direction. For that purpose, the central portion 7b has openings that place in communication the inner zone 7c with an inner zone of the central portion 7b. One or more blades 8 can be located within the central portion 7b. Advantageously, this embodiment is more suitable for lower flow rates and higher pressure variations.

As shown schematically in FIGS. 8a, 8b, 9 and 10, the rotating element 7 can have different dimensions according to the fluid dynamic performance to be obtained by the valve 1. It may comprise various tubular portions 71,72; in this case two are shown, each of which is provided with external blades 81,82. An inner tubular portion 71 may also be provided with inner blades 83. The presence of various tubular portions, each equipped with outer blades and/or inner blades, increases the amount of energy recovered by the rotating element. The presence of various tubular portions further allows the drop in pressure produced by the rotating element to be regulated. Directing the fluid towards a tubular portion or towards various tubular portions actually enables the drop in pressure produced in the fluid while it crosses the rotating element 7 to be regulated.

In the embodiments that comprise a rotating element 7, the valve according to the present invention causes a pressure drop in the fluid which is substantially transformed into kinetic energy of the rotating element 7 itself.

Thanks to its configuration, the rotating cylinder can effectively control and limit flashing and cavitation phenomena, for uncompressible fluids, and choking, for compressible fluids. This drastically reduces the noisiness of the valve.

The geometry of the blade or blades 8, that is the angle of inclination that they have with respect to the flow of fluid, and the extension that they have in the longitudinal direction allow the drop in pressure and maximum flow rate of fluid to be determined.

The angle of inclination and the longitudinal extension of the blades 8 enable the pressure change required of the valve 1 to be produced gradually and not suddenly, transforming it into mechanical work.

The structure of the rotating element 7 further allows losses in the form of vibrations and in the form of heat to be limited as much as possible, since the friction with the fluid is reduced drastically, hence the conversion into mechanical energy is as high as possible.

To convert the kinetic energy of the rotating element 7 into electrical energy, the recovery means 5 comprise a stator (not illustrated) preferably associated with the valve body 2 and placed at the rotating element 7. The rotating element 7 itself defines a rotor electromagnetically coupled with said stator. Advantageously, this allows high conversion efficiency to be obtained, containing the dimensions.

Alternatively, the recovery means 5 comprise an electrical energy generator (not shown) placed outside the valve body 2. Mechanical transmission means (not shown) are configured to transfer kinetic energy from the rotating element 7 to the generator. Advantageously, this configuration prevents electromagnetic coupling within the valve 1, and is preferable if the fluid transiting within the valve 1 is flammable. The mechanical transmission means are not further described since they are known by a person skilled in the art.

In a first embodiment the obturator 6 comprises at least a first 10 and a second plate 11 placed transversally to the axis of rotation "A" of the rotating element 7. In particular, the first 10 and the second plate 11 each have at least one passage opening 12. The first 10 and the second plate 11 are mobile with respect to each other to pass reversibly from a closed configuration, wherein the passage openings 12 are completely disaligned with respect to each other to prevent the passage of fluid, to at least one open configuration, wherein the passage openings 12 are at least partially overlapping to allow the passage of fluid.

In further detail, the first 10 and the second plate 11 are preferably circular and arranged coaxially in order to be able to rotate between each other. In more detail, the first 10 and the second plate 11 have a central axis which substantially coincides with the axis of rotation "A" of the rotating element 7. The passage openings 13 are substantially circular sector shaped.

Note that the first plate 10 is preferably fixed to the valve body 2, while the second plate 11 is rotatably associated with the first plate 10. Furthermore the first 10 and/or the second plate 11 comprise a grille 13 placed at the passage opening 12. Advantageously, the grille 13 can totally or partially occupy the passage opening 12, so as to obtain the fluid flow variation required by the particular application. Even more advantageously, the grille 13 contributes, where necessary, to preventing the cavitation of the fluid within the valve 1. A further advantage of the grille 13 is connected with the reduction in noise caused by the passage of fluid within the valve 1.

Figure 10:
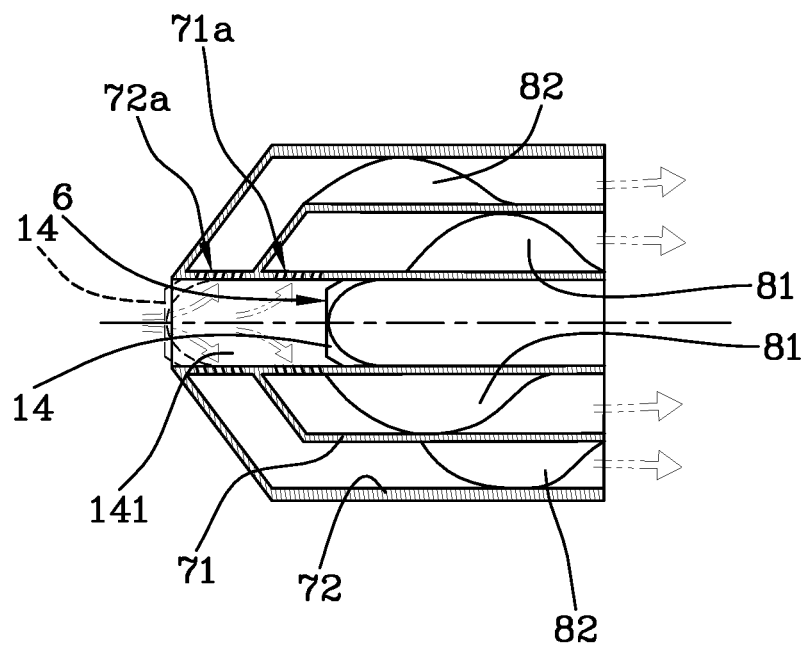
FIG. 10 illustrates a further embodiment of the valve according to the present invention.

According to an alternative embodiment of the invention, shown in FIGS. 7 and 10, the obturator 6 comprises a sliding element 14 associated with the inlet opening 3. The sliding element 14 is mobile moving away from/towards the inlet opening 3, so as to open and/or close it. In particular, note that the sliding element 14 is arranged coaxially with respect to the rotating element 7. Advantageously, this enables a more compact valve 1 to be obtained. The embodiment shown in FIG. 10 comprises a rotating element 7 provided with two tubular elements 71,72. Each tubular element may be reached by the fluid through radial openings 71a,72a afforded on the lateral wall of an axial conduit 141 along which the sliding element 14 is slidable. Sliding along said axial conduit 141, the sliding element 14 progressively uncovers the radial openings 71a,72a. According to an alternative embodiment of the invention (shown in FIGS. 8a and 8b) the obturator 6 may be of the eccentric type, that is rotatable with respect to a hinge 15 placed transversally to the path of the fluid. The obturator 6 can rotate about a hinge 15 so as to open and/or close, even partially, the access to the rotating element 7. By way of example, the obturator 6 could have a spherical sector or be a sphere.

Figure 9:
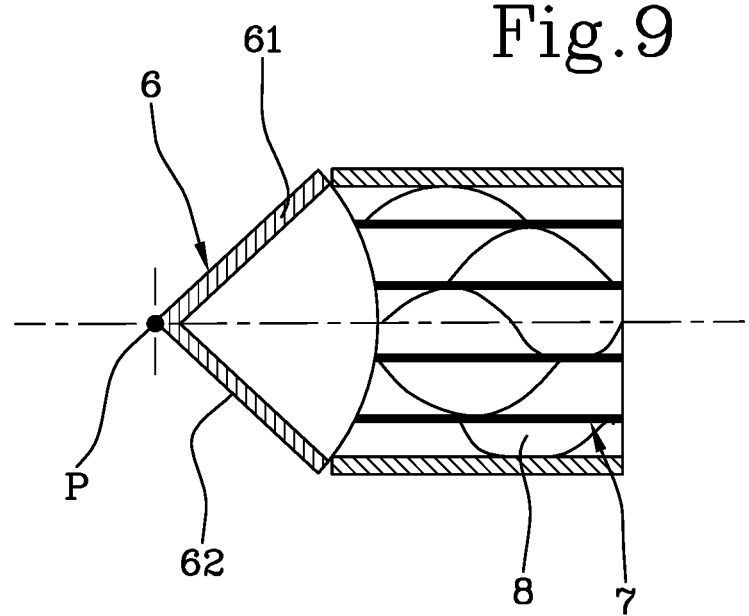
FIG. 9 illustrates a further embodiment of the valve according to the present invention.

According to a third alternative embodiment of the invention, shown in FIG. 9, the obturator 6 comprises a single plate which has two portions 61,62 hinged to each other at a hinge axis P. Such portions 61,62 can rotated between a more open configuration, shown in FIG. 9, wherein they close the passage to the fluid, and can move closer to each other rotating about the hinge axis to open the passage to the fluid, as represented with a broken line in FIG. 9.

Figure 2:
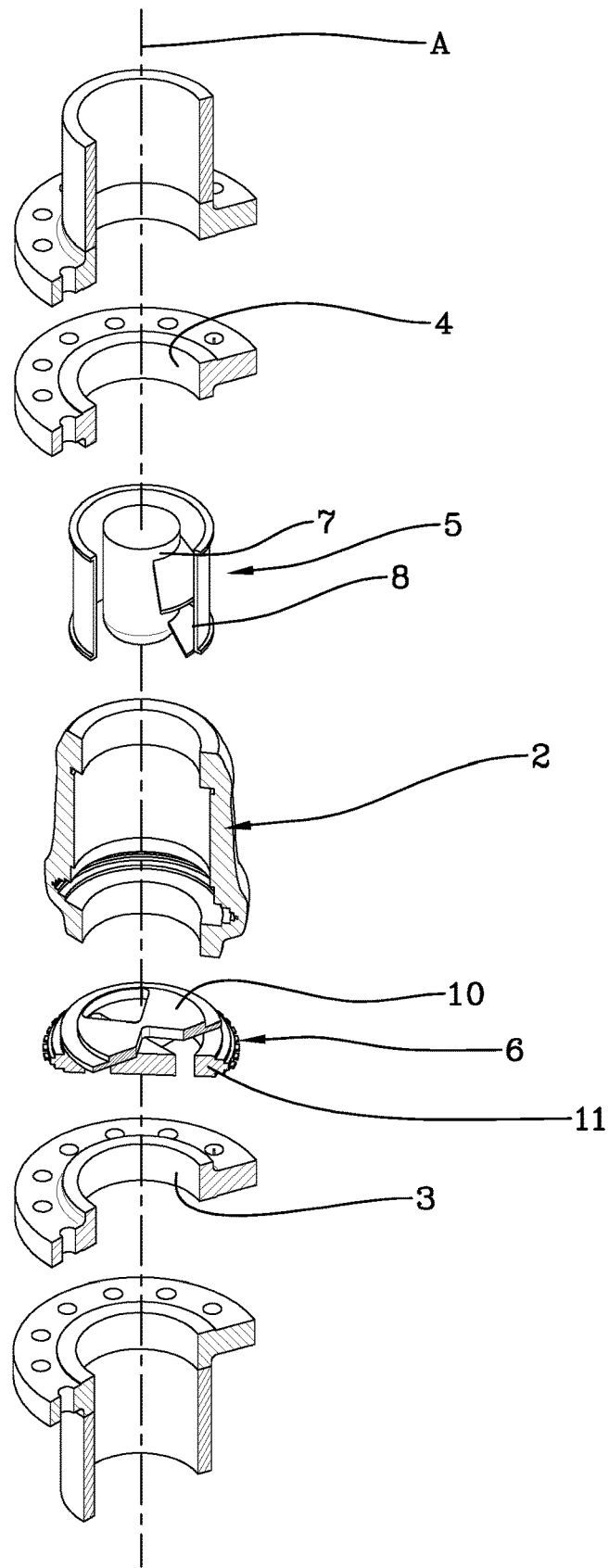
FIG. 2 is an exploded and partially sectional view of the valve of FIG. 1.

The valve according to the present invention can comprise a deflector 31, interposed between the obturator 6 and the recovery means 5, structured to align the liquid flow parallel to a prefixed direction "F". In the embodiment as shown in FIGS. 1 and 2, the direction "F" is parallel to the longitudinal axis "X".

Figure 11:
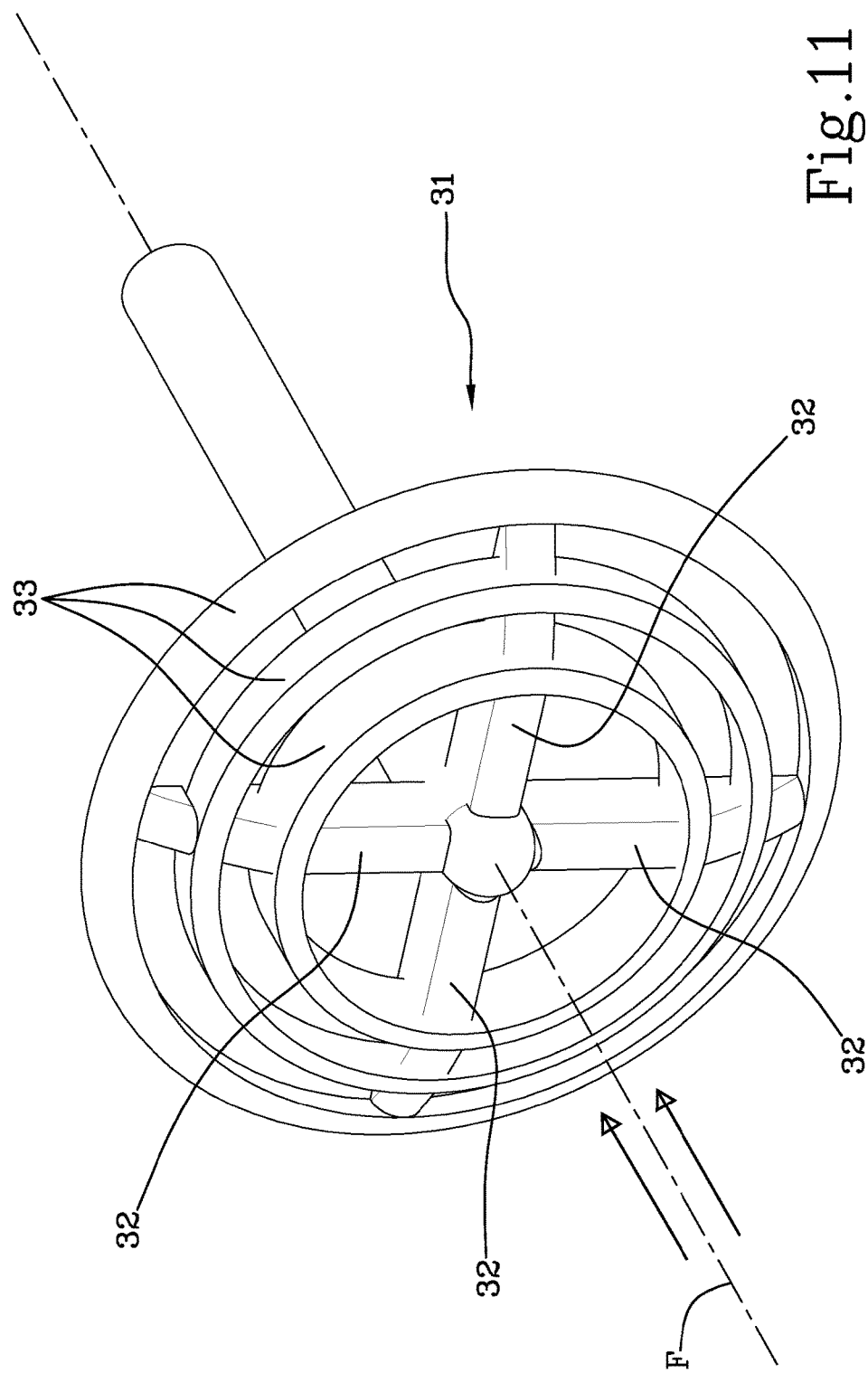
FIG. 11 illustrates an additional feature for the valve according to the present invention.

As shown in FIG. 11, the deflector 31 comprises one or more vanes 32 that extend at least partially in a radial direction with respect to the prefixed direction F of the flow. In the illustrated embodiment the obturator comprises four vanes 32, arranged at right angles one with respect to the other and arranged radially with respect to the direction "F".

It is obviously possible to provide a different number of vanes 32 or to use vanes of a different form or inclination, for example helical vanes on the basis of the kind of fluid to be treated and the conformation of the recovery means 5.

Figure 12:
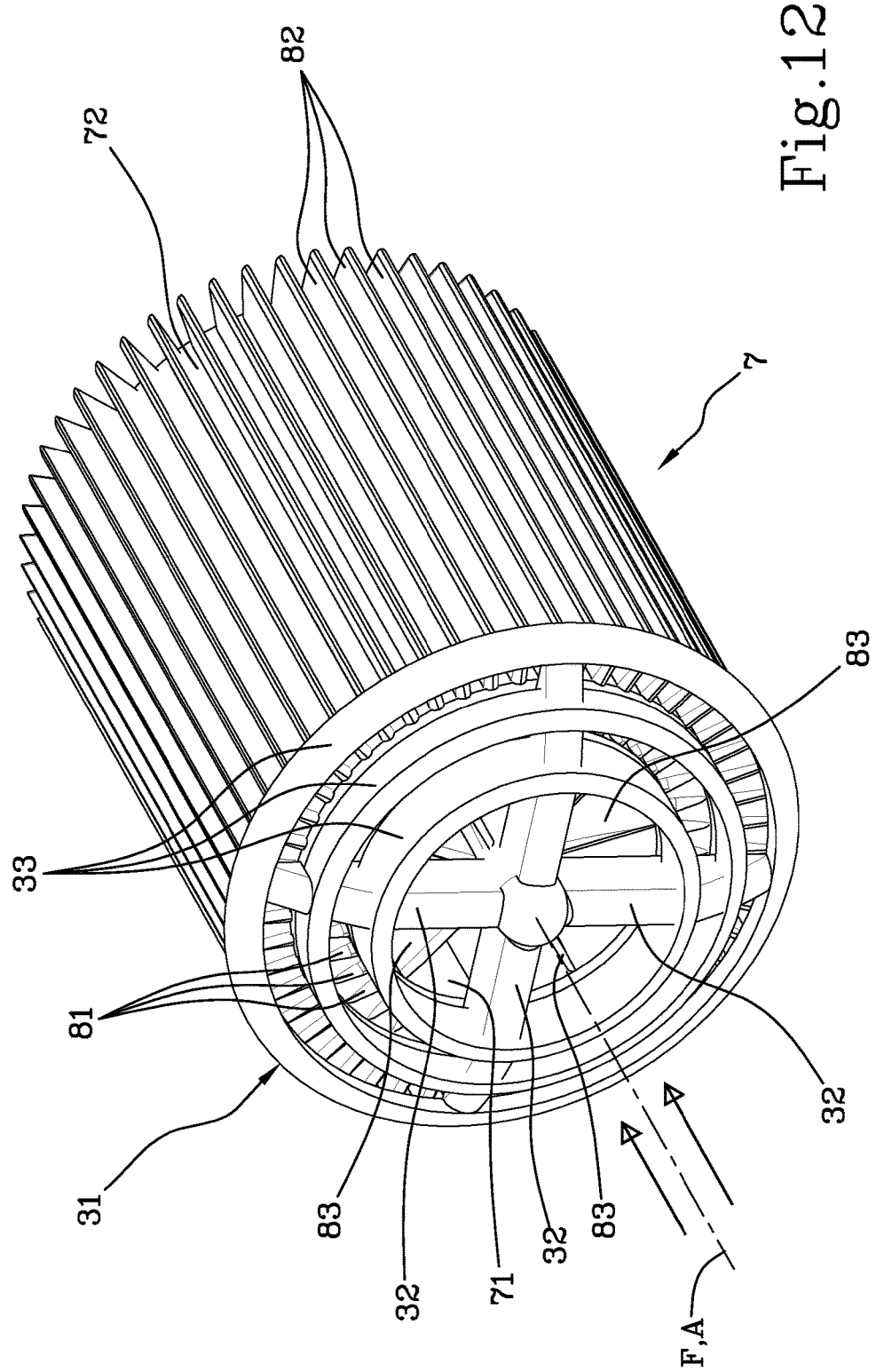
FIG. 12 illustrates the additional feature shown in FIG. 11, in a first preferred embodiment.
Figure 13:
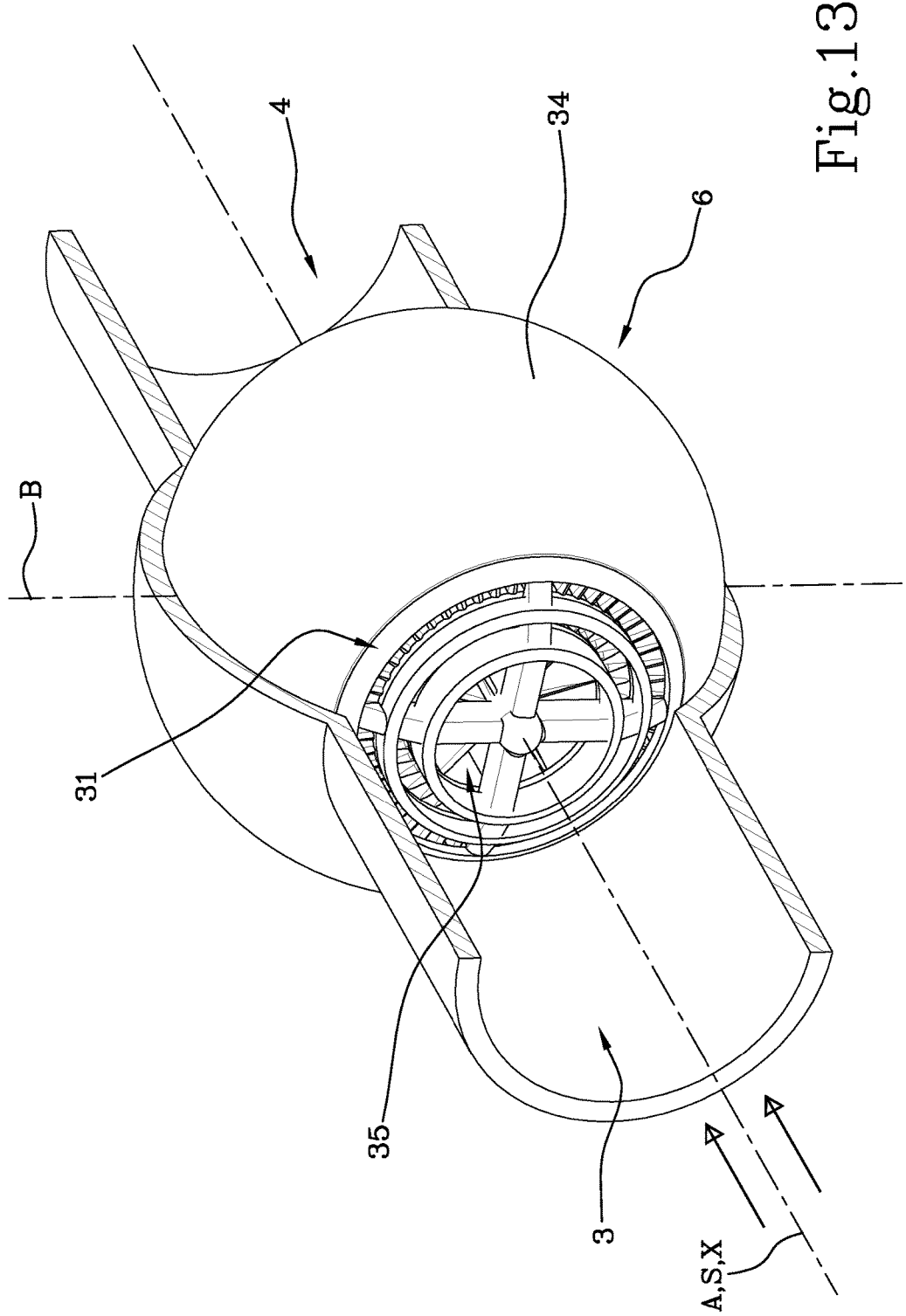
FIG. 13 illustrates a schematic view of a further embodiment of the valve, in a partial section.
Figure 14:
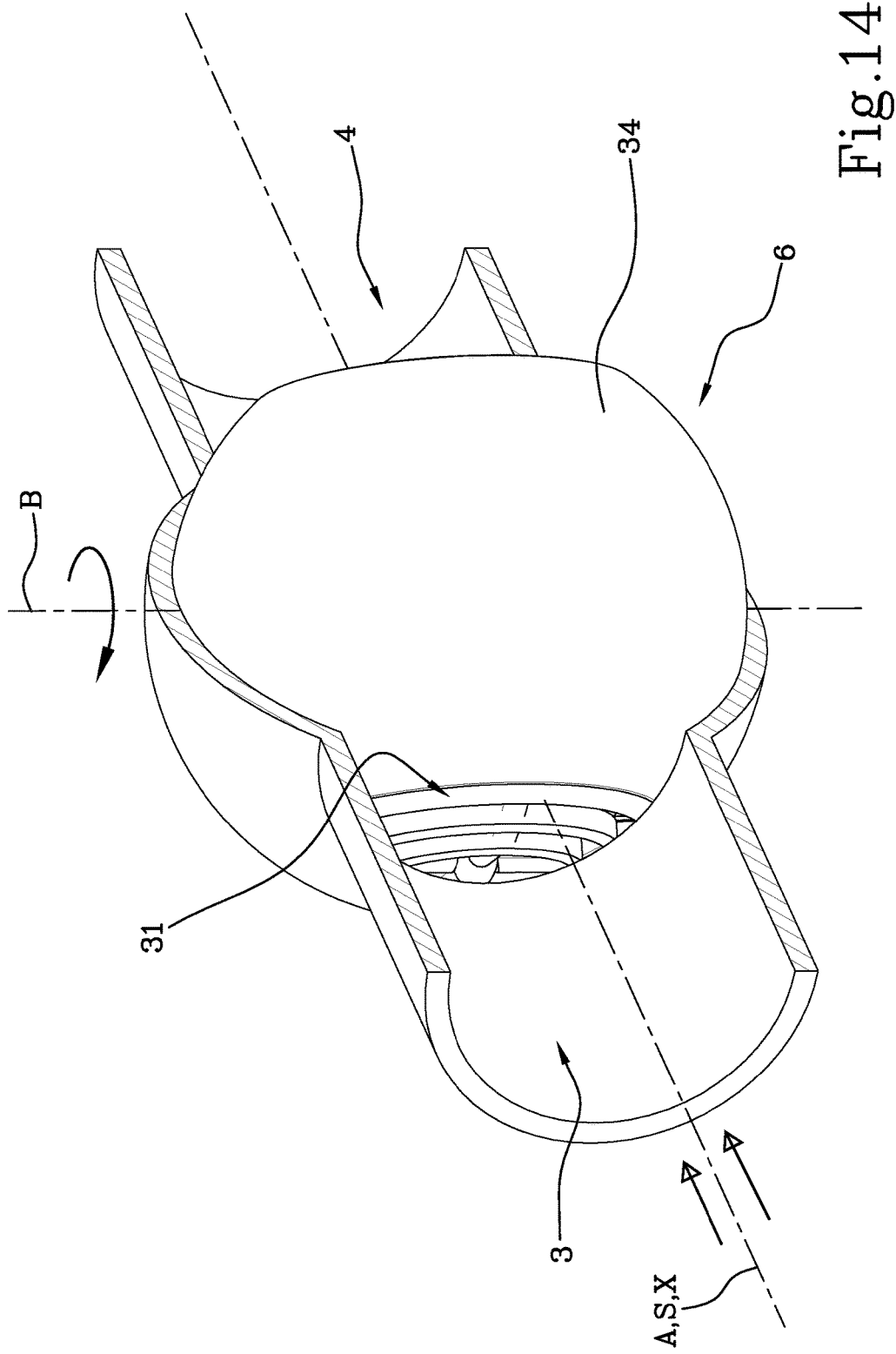
FIG. 14 illustrates the valve according to FIG. 13, in a configuration of partial opening.

In FIG. 12, for example, an embodiment is shown in which the flow direction F is parallel to the rotation axis "A" of the recovery means 5. The recovery means 5 are substantially the same as the ones in the embodiment shown in FIG. 9, that is they comprise a rotating element 7 provided with two tubular portions 71, 72 that are concentric to the rotation axis "A", each of which is provided with external blades 81,82.

The internal tubular portion 71 is also provided with inner blades 83. The deflector 31 is placed in front of the rotating element 7 with respect to the flow direction, that is located at the input of the rotating element 7.

The deflector 31 can be provided with one or more annular segments 33 concentric one to the other. Said annular segments 33 help to improve the directionality of the flow, contributing in further limiting the turbulences, and allowing the passage of the liquid in the subsequent flow tubes defined between the tubular portions. In the embodiment as shown in FIG. 12, two annular segments 33 are substantially aligned with the tubular portions 71, 72 of the rotating element 7, whereas a third annular segment 33 is positioned radially external with respect to blade 82 of the external tubular portion 72.

In case the rotating element 7 comprises one single tubular portion 71, the deflector 31 is preferably equipped with only two annular segments 33, one more internal aligned with the tubular portion 71 and one more external placed in a position radially external with respect to the blades 81 of the tubular portion 71.

In a further preferred embodiment of the valve, the obturator 6 comprises a rotating body 34, provided with a passage cavity 35, that is rotatable along a regulating axis B perpendicular to the longitudinal axis X. The recovery means 5 are located inside the passage cavity 35. Preferably the recovery means 5 are of the form in which they comprise a rotating element 7 that, in this case, is rotating inside the cavity 35. The rotating axis A of rotating element 7, in this case, is not fixed, but changes its orientation jointly to the rotation of the rotating body 34.

The passage cavity 35 presents a longitudinal axis "S" and, when in use, the liquid to be treated flows through it. The rotating body 34 can rotate between at least an open position in which the passage cavity 35 puts in contact the inlet opening 3 with the outlet opening 4, and a closed position in which the passage cavity 35 is not in communication with the inlet and outlet openings 3,4.

The rotating body 34 can rotate between at least a complete opening position, in which the longitudinal axis S of the passage cavity 35 is aligned with the longitudinal axis X of the valve, and a closing position, in which the passage cavity 35 does not face the inlet opening 3.

In the closing position the liquid is substantially intercepted by the rotating body 34 and can not flow through the passage cavity 35.

An obturator 6 of the type as earlier described can be positioned at the end of the inlet of the passage cavity 35, upstream the rotating element 7. According to further alternative embodiments, the obturator 6 can be of the spherical and/or of a generic rotation type, that can contain rotating means. Advantageously, this allows the specific shape of the valve 1 to be adapted to the different operating requirements.

The invention claimed is:

1. A control valve (1) comprising: a valve body (2) which has an inlet opening (3) and an outlet opening (4) for a fluid; recovery means (5) configured to transfer the kinetic and/or potential energy extracted from said fluid out of said valve body (2); a obturator (6) placed within said valve body (2) between said inlet and outlet openings (3, 4), said obturator (6) being configured to direct the fluid towards the recovery means (5) and to assume a closing configuration of the valve (1); wherein said recovery means (5) comprise a rotating element (7) placed within said valve body (2) downstream of the obturator (6) and configured to be put into rotation by said fluid; the inlet opening (3) defining a first fluid flow direction, the outlet opening (4) defining a second fluid flow direction, the first fluid flow direction being (a) in the same direction as, and (b) parallel to, the second fluid flow direction; wherein said obturator (6) comprises at least a first plate (10) and a second plate (11) placed transversally with respect to the axis of rotation (A) of the rotating element (7); said first plate (10) and second plate (11) each having at least one passage opening (12); said first plate (10) and said second plate (11) being mobile with respect to each other to pass reversibly from a closing configuration wherein said passage openings (12) are completely disaligned with respect to each other to prevent the passage of the fluid to at least an opening configuration wherein said passage openings (12) are at least partially overlapping to permit the passage of the fluid, each of said first and second plates (10, 11) having a central portion, the first plate central portion being unconstrained with respect to the second plate central portion.

2. The valve (1) according to claim 1, characterised in that said recovery means (5) comprise a stator associated with the valve body (2) and placed at said rotating element (7); said rotating element defining a rotor electromagnetically coupled with said stator.

3. The valve (1) according to claim 1, characterised in that said rotating element (7) is provided with at least one blade (8) or another element adapted to interact with the fluid and to allow the development of aero/hydrodynamic forces able to put the rotating element (7) in rotation.

4. The valve (1) according to claim 1, comprising a deflector (31), interposed between the obturator (6) and the recovery means (15), structured to align the liquid flow parallel to a prefixed direction (F), wherein the deflector (31) comprises one or more blades (32) of constant thickness that extend at least partially in a radial direction with respect to the prefixed direction (F).

5. The valve according to claim 4, wherein the deflector (31) has one or more annular segments (33) of constant thickness that are concentric between each other.

6. The valve (1) according to claim 1, wherein the obturator (6) comprises a first plate (10) and a second plate (11), the valve (1) defining a fluid flow channel between the obturator (6) and the rotating element (7), the fluid flow channel defining a third fluid flow direction, the third fluid flow direction being (a) in the same direction as, and (b) parallel to, the first fluid flow direction, the first plate (10) and the second plate (11) being placed transversally with respect to the third fluid flow direction.

7. The valve (1) according to claim 6, wherein the first plate (10) and the second plate (11) are placed transversally with respect to the third fluid flow direction immediately downstream of the obturator (6).

8. The valve (1) according to claim 1, wherein the first plate (10) and/or the second plate (11) comprises a grille (13), the grille (13) being a plurality of grille openings which are in addition to the at least one passage opening (12), each grille opening being smaller than the at least one passage opening (12).

9. The valve (1) according to claim 8, wherein the grille (13) contributes to (a) prevention of cavitation of the fluid within the valve (1) and (b) reduction in noise caused by passage of fluid within the valve (1).

10. The valve (1) according to claim 1, wherein each of the first and second plates (10, 11) has a perimeter, the perimeter of the first plate (10) or the perimeter of the second plate (11) being located within and rotatable within a groove in a housing around said first and second plates (10, 11).

11. The valve (1) according to claim 8, wherein the first plate (10) and the second plate (11) comprises a grille (13), each of the first and second plates (10, 11) having only two passage openings (12), each said grille (13) being (a) located immediately adjacent a respective passage opening (12) and (b) occupying a space substantially the same size and shape of said grille's respective passage opening (12).

* * * * *